(12) United States Patent
Hohnbaum

(10) Patent No.: US 10,392,765 B1
(45) Date of Patent: Aug. 27, 2019

(54) FLAP GATE DRAINAGE SYSTEMS

(71) Applicant: Jeremy Hohnbaum, Temecula, CA (US)

(72) Inventor: Jeremy Hohnbaum, Temecula, CA (US)

(*) Notice: Subject to any disclaimer, the term of this patent is extended or adjusted under 35 U.S.C. 154(b) by 0 days.

(21) Appl. No.: 15/943,303

(22) Filed: Apr. 2, 2018

(51) Int. Cl.
*E02B 7/44* (2006.01)
*E02B 8/04* (2006.01)
*E02B 8/06* (2006.01)

(52) U.S. Cl.
CPC ............ *E02B 7/44* (2013.01); *E02B 8/045* (2013.01); *E02B 8/06* (2013.01); *E05Y 2600/32* (2013.01); *E05Y 2900/40* (2013.01)

(58) Field of Classification Search
CPC combination set(s) only.
See application file for complete search history.

(56) References Cited

U.S. PATENT DOCUMENTS

| | | | | |
|---|---|---|---|---|
| 420,367 | A * | 1/1890 | Walker | F16K 15/03 137/527.6 |
| 664,078 | A * | 12/1900 | Frank et al. | E04H 17/00 405/99 |
| 929,514 | A * | 7/1909 | Egan | B01D 35/147 137/527.6 |
| 2,259,128 | A * | 10/1941 | Egan | E03F 7/04 137/527.6 |
| 2,961,836 | A * | 11/1960 | Hanson | E02B 11/00 137/527.6 |
| 4,091,624 | A | 5/1978 | Steinke | |
| 4,296,945 | A * | 10/1981 | Pavlik | A45C 15/02 150/135 |
| 4,800,919 | A * | 1/1989 | Bachmann | F16K 15/03 137/527.4 |
| 4,966,397 | A * | 10/1990 | McKinnon | F16L 47/30 285/197 |
| 6,474,365 | B1 * | 11/2002 | Brown | E04D 13/08 137/360 |
| 6,779,947 | B1 | 8/2004 | Buchanan | |
| 7,699,564 | B2 * | 4/2010 | Shaw | B23K 1/0006 405/184.1 |
| 7,987,873 | B2 * | 8/2011 | Kiest, Jr. | F16L 55/163 138/97 |
| 2012/0175872 | A1 * | 7/2012 | Lindsey | B29C 66/322 285/189 |
| 2013/0076022 | A1 * | 3/2013 | Wermelinger | F16L 47/32 285/133.11 |

OTHER PUBLICATIONS www.jueltide.com; Juel Tide Gates; Flap Gate / Tide Gate Alternatives; May 2010.

* cited by examiner

*Primary Examiner* — Kyle Armstrong
(74) *Attorney, Agent, or Firm* — Rutan & Tucker, LLP

(57) ABSTRACT

Single-door flap gates and double-door flap gates are disclosed. Flap gates of the inventive subject matter are coupled with a structural element by one or more linkages, where hinges that are coupled with the structural element allow flap gate doors to open when sufficient fluid build-up exists behind the doors to push the doors open. Hinges are mounted at an angle. Features to facilitate fluid drainage despite the flap gate doors being closed are also contemplated.

17 Claims, 7 Drawing Sheets

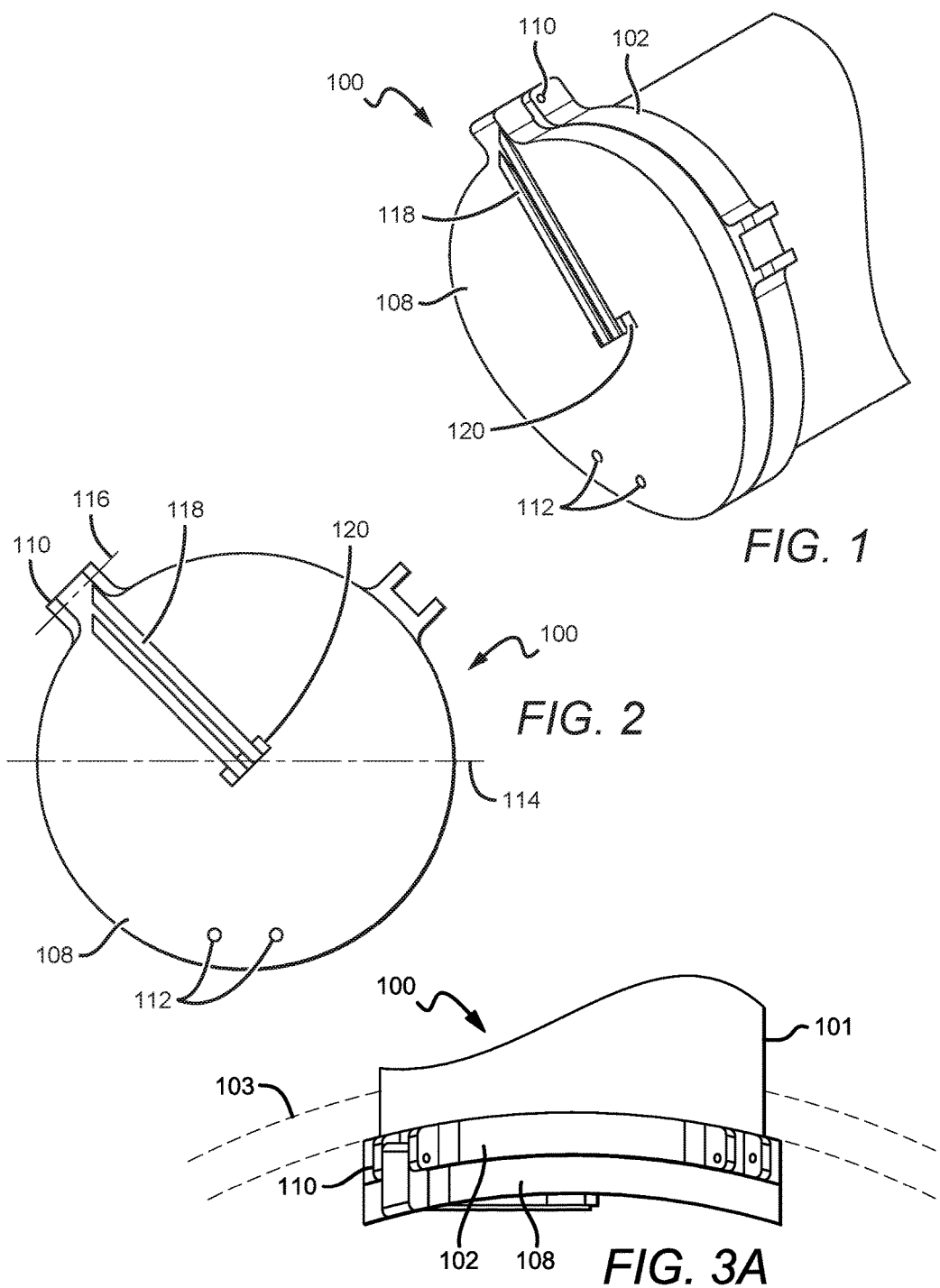

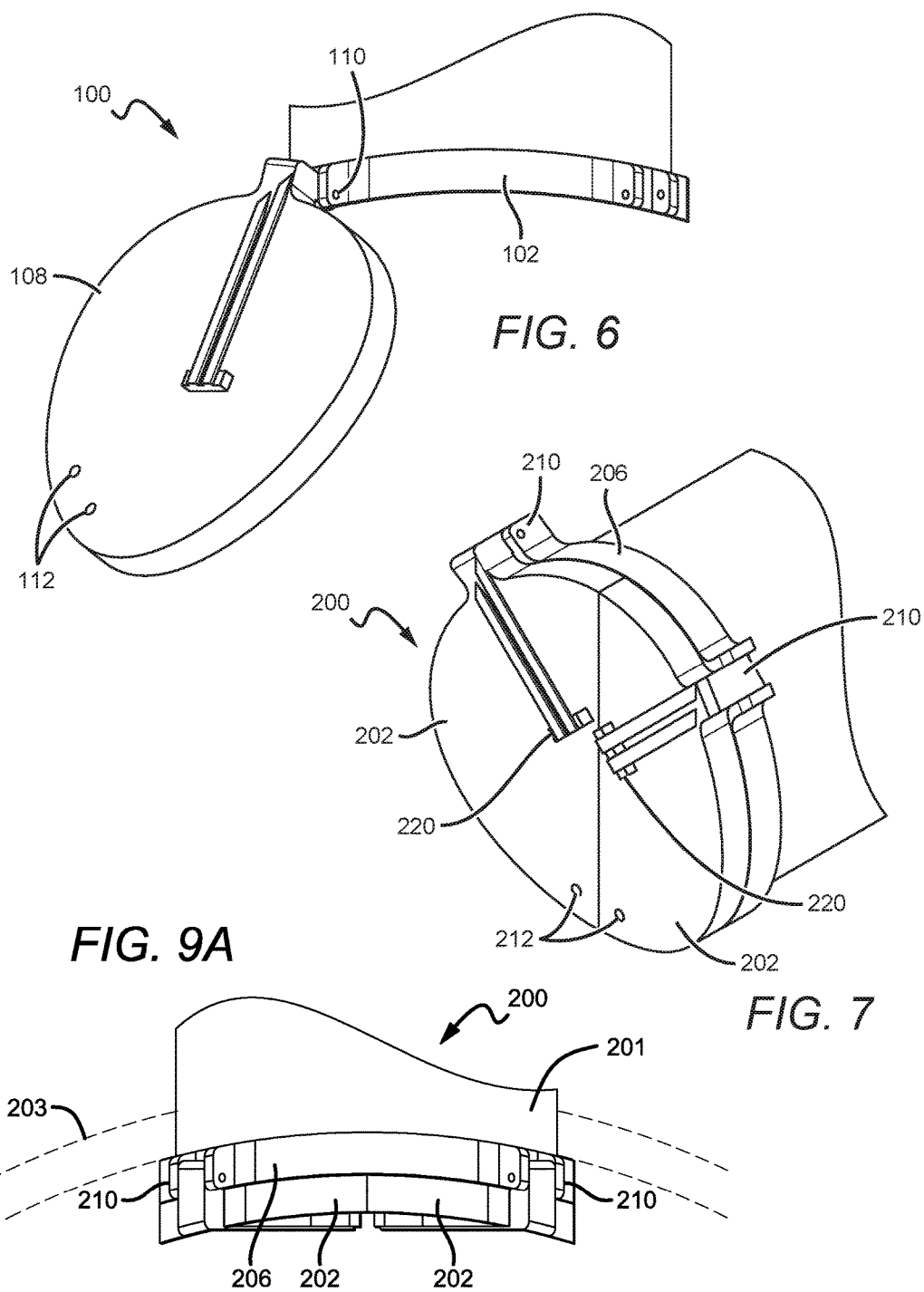

FLAP GATE DRAINAGE SYSTEMS

FIELD OF THE INVENTION

The field of the invention is flap gates for water drainage and flow restriction.

BACKGROUND

The background description includes information that may be useful in understanding the present invention. It is not an admission that any of the information provided in this application is prior art or relevant to the presently claimed invention, or that any publication specifically or implicitly referenced is prior art.

Flap gates are not new, but the field is underdeveloped. These relatively simple devices have not been subject to much new thinking, leaving open many opportunities for development of new, inventive concepts.

For example, U.S. Pat. No. 4,091,624 to Steinke describes an angled hinge on a flap gate system, but it fails to contemplate other configurations that deviate from what is currently known. It fails to consider a configuration with multiple flaps, it does not consider a need for different shapes of the flaps to achieve different effects or to fit into uniquely shaped spaces, and so on.

In another example, U.S. Pat. No. 6,779,947 to Buchanan et al. teaches a flap gate having a top-mounted hinge that allows the gate to open when sufficient head pressure exists behind the flap. It teaches several other mechanisms that are simple plays on that same head pressure concept. The patent fails to consider other advances that can be made in the state of the art outside of this basic concept.

These and all other extrinsic materials discussed in this application are incorporated by reference in their entirety. Where a definition or use of a term in an incorporated reference is inconsistent or contrary to the definition of that term provided in this application, the definition of that term provided in this application applies and the definition of that term in the reference does not apply.

It has yet to be appreciated that flap gates can be designed using different flap configurations to accommodate a wider variety of applications. Thus, there is still a need in the art for improved flap gates to facilitate water flow and drainage.

SUMMARY OF THE INVENTION

The present invention provides apparatus, systems, and methods in which flap gates are made and implemented in novel new ways. In one aspect of the inventive subject matter, a flap gate is contemplated. The flap gate includes a first door coupled with a first hinge and a second door coupled with a second hinge, where the first door and the second door together form a continuous concave surface. It also includes a structural element having a through-hole, where the first hinge and the second hinge couple with the structural element, and where the first door and the second door rest against the structural element to cover the through-hole.

In some embodiments, either the first door, the second door (or both) includes a feature to allow fluid flow while the first door and the second door rest against the structural element. It is contemplated that the hinges can couple with the doors via one or more linkages such that the linkage allows for rotation about a fixed axis at a point where the linkage couples with a hinge.

In some embodiments the hinges couple with the structural element such that the first and second doors opens by rotating about axes of rotation defined by the hinges, where the axes of rotation are angled between 10 and 80 degrees from horizontal where the angular measurement is an absolute value. Similarly, the second hinge is coupled with the structural element such that the second door opens by rotating about a first axis of rotation of the first hinge, and wherein the first axis of rotation is angled between 10 and 80 degrees from horizontal.

In another aspect of the inventive subject matter, another flap gate is contemplated. It includes: a door coupled with a hinge, where the door comprises a concave outer surface, and where the hinge is coupled with a structural element having a through-hole. The hinge is coupled with the structural element such that the door opens by rotating about an axis of rotation of the hinge. The axis of rotation is angled between 10 and 80 degrees from horizontal, and the door rests against the structural element to cover the through-hole.

In some embodiments, the door includes a feature to allow fluid flow past the door while the door rests against the structural element. It is contemplated that the hinge can be coupled with the structural element such that the door opens by rotating about an axis of rotation defined by the orientation of the hinge. The axis of rotation can be angled between 10 and 80 degrees from horizontal.

In another aspect of the inventive subject matter, yet another flap gate is contemplated. The flap gate includes: a first door coupled with a first hinge and a second door coupled with a second hinge, where the first door and the second door together form a continuous concave surface; a structural element having a through-hole, where the first hinge and the second hinge couple with the structural element, and where the first door and the second door rest against the structural element to cover the through-hole; and where at least one (or both) of the doors has a feature to allow fluid flow while the doors rest against the structural element.

In some embodiments, the doors are coupled with the structural element by a linkage. The hinges can couple with the structural element such that the doors opens by rotating about axes of rotation where the axes of rotation are angled between 10 and 80 degrees from horizontal (measured as an absolute value).

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 1 is a perspective view of a single-door flap gate with the door closed.

FIG. 2 is a front view of a single-door flap gate with the door closed.

FIGS. 3A and 3B illustrate a top view of a single-door flap gate with the door closed.

FIG. 6 is a top view of a single-door flap gate with the door open.

FIG. 7 is a perspective view of a double-door flap gate with the door closed.

FIGS. 9A and 9B illustrate a top view of a double-door flap gate with the door closed.

DETAILED DESCRIPTION

Figure 3B:
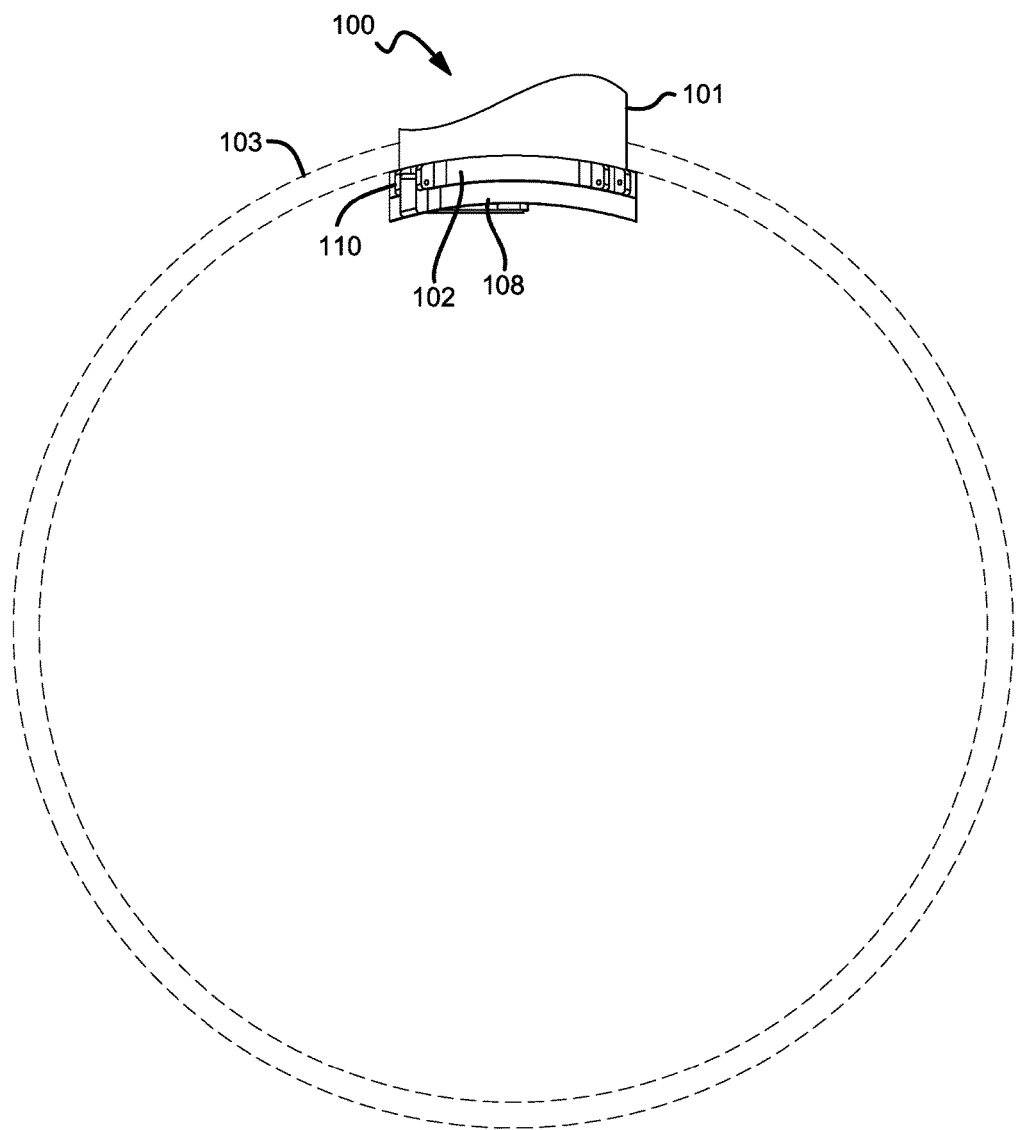

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

Several embodiments of the inventive subject matter are described in detail in this application. The overarching purpose of the inventive subject matter described in this application is to create a device to allow for fluid to drain from, for example, a pipe. There are two main embodiments of the inventive subject matter: a flap gate with a single door, and a flap gate with double doors. These embodiments, and related features that can be implemented into each of them, are described in detail below. It is contemplated that any feature described with respect to one embodiment can also be applied to the other embodiment, even if it is not explicitly stated as being a feature of the other embodiment.

Single door embodiments of the inventive subject matter include at least a structural element, a flap door, a hinge, and a linkage. The structural element is typically formed to take the shape of the structure that it is to be coupled with (e.g., a circular cross section so that it can couple with a cylindrical drain pipe). The flap door is sized and dimensioned to cover the opening of the structural element, and it is coupled with the structural element by a linkage and at least one hinge.

A structural element for a single-door flap gate 100 of the inventive subject matter can be seen in FIGS. 1-6. The structural element 102 provides a frame for other components of the flap gate to couple with. It includes an opening 104 through which water or other fluids can flow. It gives structural stability, and it also matches the cross-sectional shape of whatever feature it is coupled with. The embodiment shown in FIGS. 1-6 includes a structural element 102 having a circular cross-sectional shape, but it is contemplated that any other cross-sectional shapes can be implemented, depending on the shape of the feature that the flap gate must be coupled with (e.g., a drain pipe having a circular cross-sectional shape). There is no required cross-sectional shape for embodiments of the inventive subject matter, but one common application—pipes—are typically cylindrical and therefore have a circular cross-sectional shape. The cross-sectional shape of the structural element 102 can thus be guided by the shape of the pipe or other element that it will be affixed to so that it can facilitate draining of water or other fluids.

Figure 4:
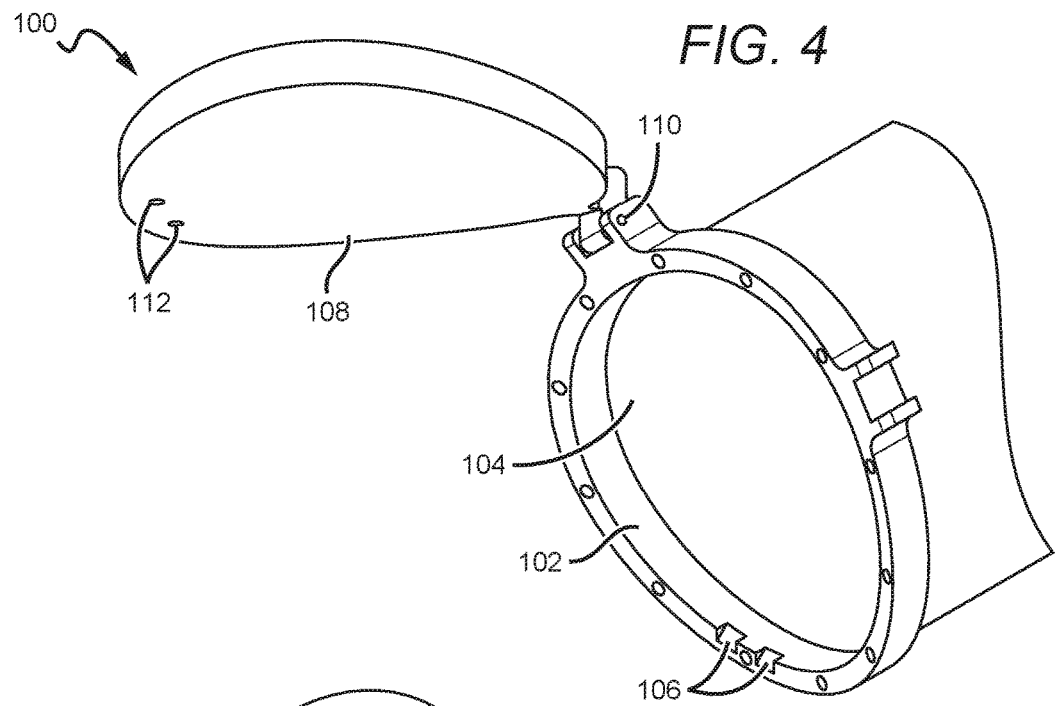
FIG. 4 is a perspective view of a single-door flap gate with the door open.
Figure 5:
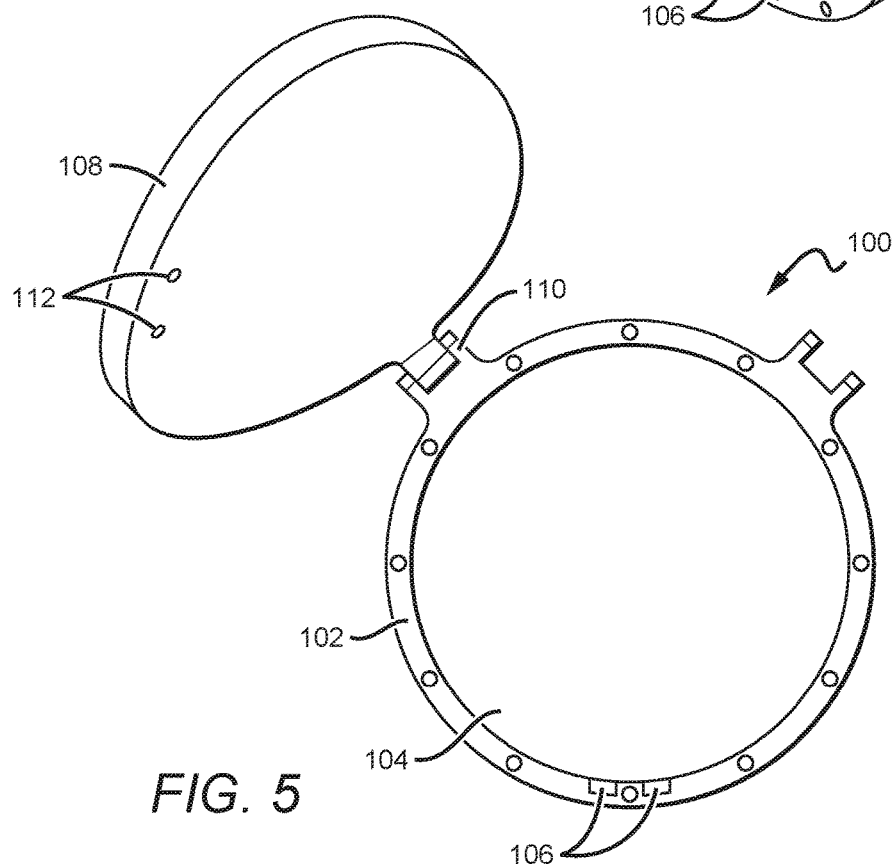
FIG. 5 is a front view of a single-door flap gate with the door open.

It is contemplated that some embodiments of the structural element can include slots, cutouts, holes, or any other form of fluid-pervious feature along the bottom edge of the structural element to allow fluid to flow out of the flap gate even when the door is not open. This feature can facilitate draining of fluid through the flap gate when there is insufficient pressure head to cause the door to open. FIGS. 4 and 5 show drains 106 in the structural element 102.

A single flap door 108 is shown in FIGS. 1-6. The flap door 108 covers the opening 104 created by the structural element 102. The flap door 108 has an outer surface and an inner surface. The outer surface is the surface facing away from the structural element 102, whereas the inner surface rests against the structural element 102. The door 108 rests against the structural element 102 as a result of gravity in conjunction with a hinge 110 that facilitates the door 108 to "fall" shut. It is contemplated that the bottom edge of the opening of the structural element 102 can protrude farther out than the top edge of the opening of the structural element 102 so that there is slightly more force (e.g., a force normal to the surface of the structural element that the door rests against).

In some embodiments, there can be a feature on a bottom portion of the flap gate 100 to allow some amount of fluid to flow out of the flap gate without the door opening (e.g., a series of holes or a small cutout). FIGS. 1-2 & 5-6 show an example of such features, holes 112, which facilitate flow of fluid through the flap door 108 even when insufficient pressure has built up behind the door to cause the door to swing open about the hinge.

It is contemplated that the outer surface of the flap door 102 can be concave, as seen in FIGS. 3A and 3B, or even flat or convex (e.g., inverting the concavity seen in FIGS. 3A and 3B). The degree and type of concavity can vary. For example, the concavity of the door shown in FIGS. 3A and 3B (and featured in all of FIGS. 1-6) is oriented so that the curvature of the door 108 wraps around an imaginary vertical line (e.g., a line that is rotated 90 degrees relative to horizontal line 114, which is shown in FIG. 2). The curvature of the door 108 (where curvature is defined as 1/radius) can be selected to match the curvature of, for example, a wall in which the flap gate is to be installed. It is not required for the door 108 to have a constant curvature, and, instead, the curvature of the door 108 can vary across different points of the door 108 so that the door 108 better matches an installation location. It is contemplated that the surface of the structural element 102 that contacts or comes close to contacting the door 108 when the door 108 is at rest can have a curvature that is complementary to the curvature of the door 108, as shown in FIGS. 1,3A-4, and 6. The same can be true of the embodiment shown in FIGS. 7-12.

It is also contemplated that the structural element 102 can have a convex surface that is opposite the surface that abuts the door 108. This can be accomplished by forming the structural element to have a constant thickness. When a curved component like the structural element 102 has a constant thickness, the result is that it has a concave side (e.g., the side that abuts the door 108 when the door is at rest) and a convex side (e.g., the side that couples with a feature such as a wall or a drainage pipe). It is also contemplated that the side of the structural element 102 that faces away from the door 108 can be flat, or it can have a different curvature (either concave or convex) from the curvature of the side of the structural element 102 that abuts the door 108.

In some embodiments, the outer surface of the door or doors has no curvature at all, while the inner surface of the door or doors is either convexly or concavely curved, with matching (e.g., complementary) curvature on the structural element. In the context of this application, a "complementary" curvature is one that facilitates one curved surface to rest against another curved surface, so that the two curve surfaces fit together.

To couple the flap door 108 with the structural element 102, a hinge 110 is required. In the context of this application, the hinge 110 can be any hinge known in the art. In some embodiments, the hinge 110 is one that facilitates a single degree of freedom of movement (e.g., rotation about a fixed axis, as shown in FIG. 1-6). Hinge 110 is located on the structural element 102 such that the hinge's axis of rotation is angled relative to horizontal where, as mentioned above, horizontal is defined by dotted line 114. It is contemplated that embodiments of the inventive subject matter should, upon installation, be oriented such that the horizontal like denoted by dotted line 114 is perpendicular to the direction of gravity.

The hinge 110 is thus mounted to the structural element 102 at an angle, where the angle of the hinge 110 is an angle between the axis of rotation of the hinge 110 (denoted by dotted line 116 in FIG. 2) and the horizontal line 114. Any amount of angle between 1-89 degrees is contemplated, though between 10 and 80 degrees is preferred. Having the door 108 mounted to an angled hinge 110 that is fixed to the structural element 102 lowers the force required to open the door 108 compared to a hinge that is mounted directly above the door.

To couple the door 108 with the hinge 110, some embodiments can include a linkage 118, as shown in FIGS. 1-6. The linkage 118 allows the door 108 to swing open to allow fluid to flow out of the opening 104 in the structural element 102 by enabling the door 108 to rotate about the fixed axis of the hinge 110. In some embodiments, the linkage 118 couples with the door 108 by another hinge 120 (e.g., a component that allows for rotation about a fixed axis).

Linkages 118 of the inventive subject matter can include one or several components, but regardless of the quantity of components comprising, or the configuration of, the linkage 118, the primary purpose of a linkage 118 as described in this application is to couple a door with a structural element via the hinge 110 so that the door can rotate about the hinge 110. For example, a linkage can be a single arm coupling the hinge to the door, or it can include two or more arms as shown in FIGS. 1-6.

In one example of a single-door flap gate of the inventive subject matter, the flap gate is attached to a drainage system for a retaining wall. A single-door flap gate can be useful on such a drainage system to prevent animals from crawling into the pipe, and also to improve the aesthetics of the drainage system so that it better matches the wall where it's mounted. When water flows through the drainage system, it flows out of the pipe that the flap gate is attached to.

In another embodiment of the inventive subject matter, as shown in FIG. 7-12, a double-door flap gate 200 is contemplated. In these embodiments, the double-door flap gate 200 includes two doors 202 that meet to cover the opening 204 created by the structural element 206. Including two doors 202 can decrease the height of the pressure head of fluid behind the doors 202 required to open the doors 202 of the flap gate 200. In an embodiment with a single door (e.g. the embodiment in FIGS. 1-6), fluid build-up behind the single door sufficient to cause the door to open can be higher compared to the amount of fluid build-up required to open double-door embodiments since each door opens individually and the individual doors weigh less than a single door.

A structural element 206 for a double-door flap gate of the inventive subject matter can be seen in FIGS. 7 and 9-12. The structural element 206 provides a frame for other components of the flap gate 200 to couple with. It includes an opening 204 through which water or other fluids can flow. It gives structural stability, and it can be created to match the cross-sectional shape of whatever feature it is coupled with, similar to the embodiment shown in FIGS. 1-6. The structural element 206 includes a structural element having a circular cross-sectional shape, but, as with the singled-door embodiment described above, it is contemplated that any other cross-sectional shapes can be implemented, depending on the shape of the feature that the flap gate must be coupled with (e.g., a drain pipe having a circular cross-sectional shape). All features of the structural element described above in relation to the single-door embodiment can be applied to the structural element of the double-door embodiment.

It is contemplated that structural elements of double-door flap gate embodiments can include one or more features to facilitate fluid flow when the doors are closed. For example, the structural element 206 can include one or more apertures 208 (e.g., holes, a mesh, or a cutout) on a bottom portion that allow for fluid to flow through the structural element 206 when the doors are closed.

Figure 8:
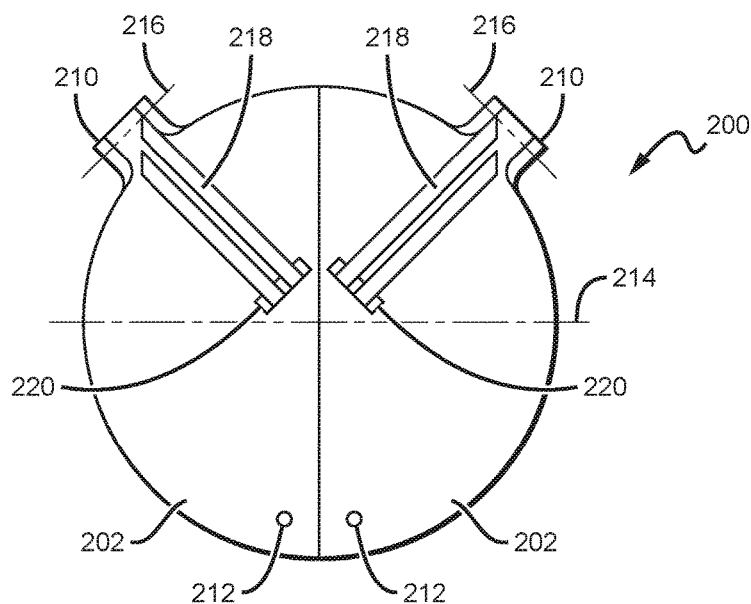
FIG. 8 is a front view of a double-door flap gate with the door closed.
Figure 10:
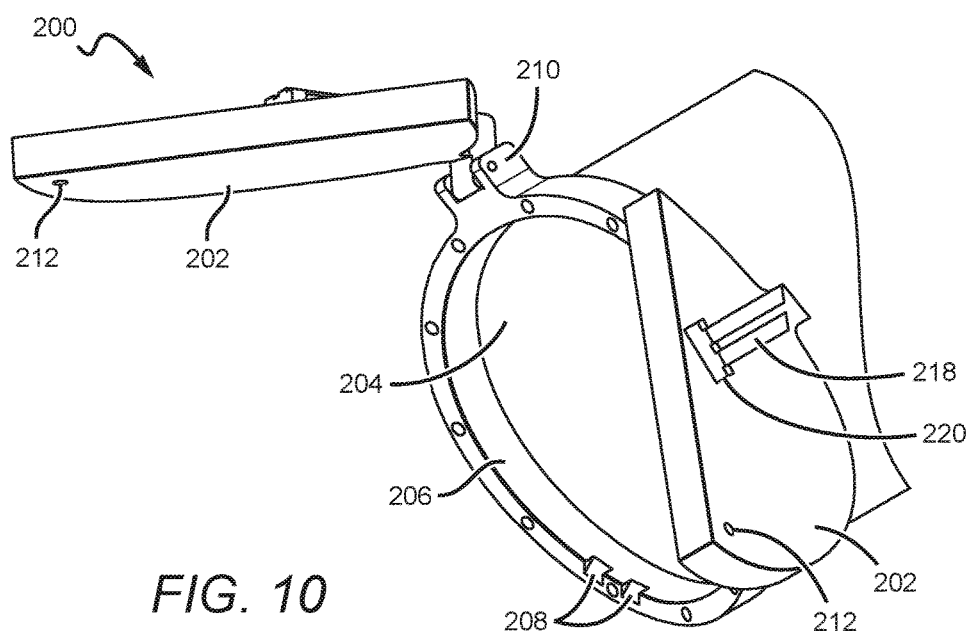
FIG. 10 is a perspective view of a double-door flap gate with the door open.
Figure 11:
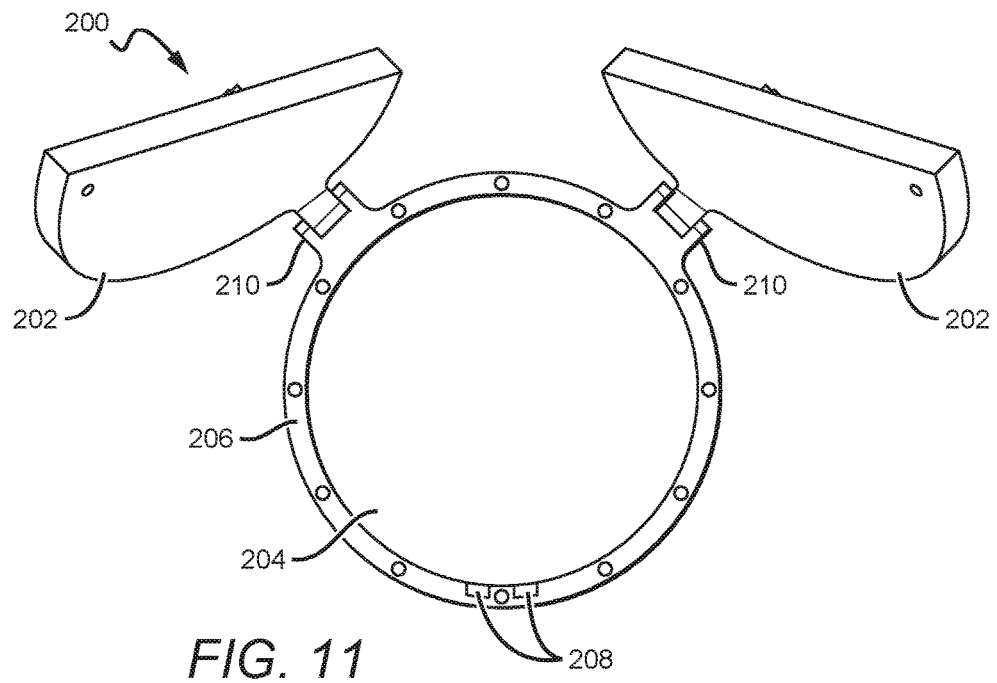
FIG. 11 is a front view of a double-door flap gate with the door open.
Figure 12:
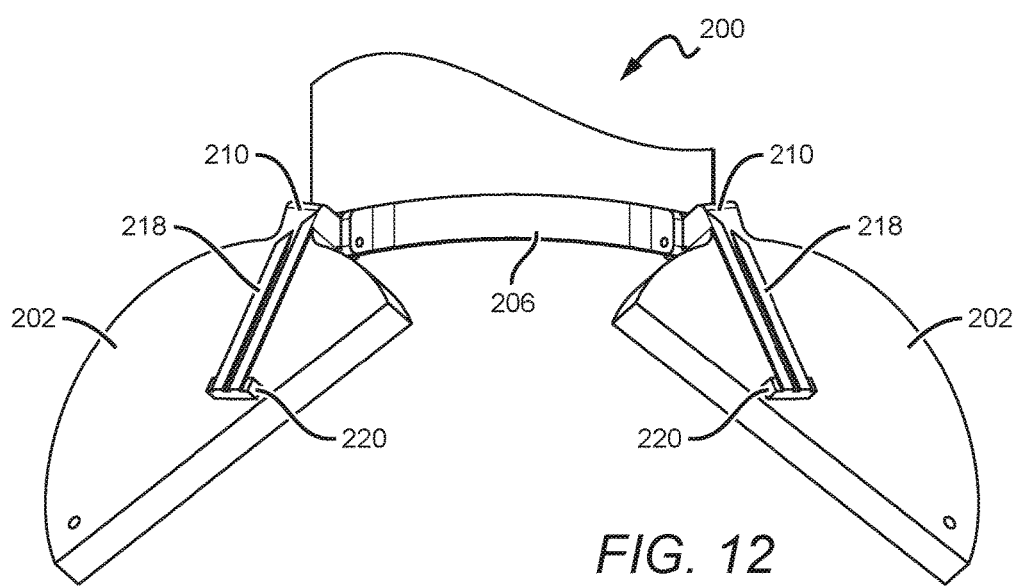
FIG. 12 is a top view of a double-door flap gate with the door open.

In the embodiment shown in FIGS. 7-12, the flap gate comprises two doors 202. As with single-door embodiments described above, the doors 202 cover the opening 204 of the structural element 206 when at rest. Because of the location and orientation of the hinges 210 that couple the doors 202 to the structural element 206, the doors 202, when at rest (e.g., when the position of the doors are primarily affected by gravity), cover the opening 204 of the structural element 206. In double-door embodiments, the doors 202 meet to close off the opening 204 of the structural element 206 such that the two doors 202 appear as one door having a split in the middle, as seen in FIG. 8.

Figure 9B:
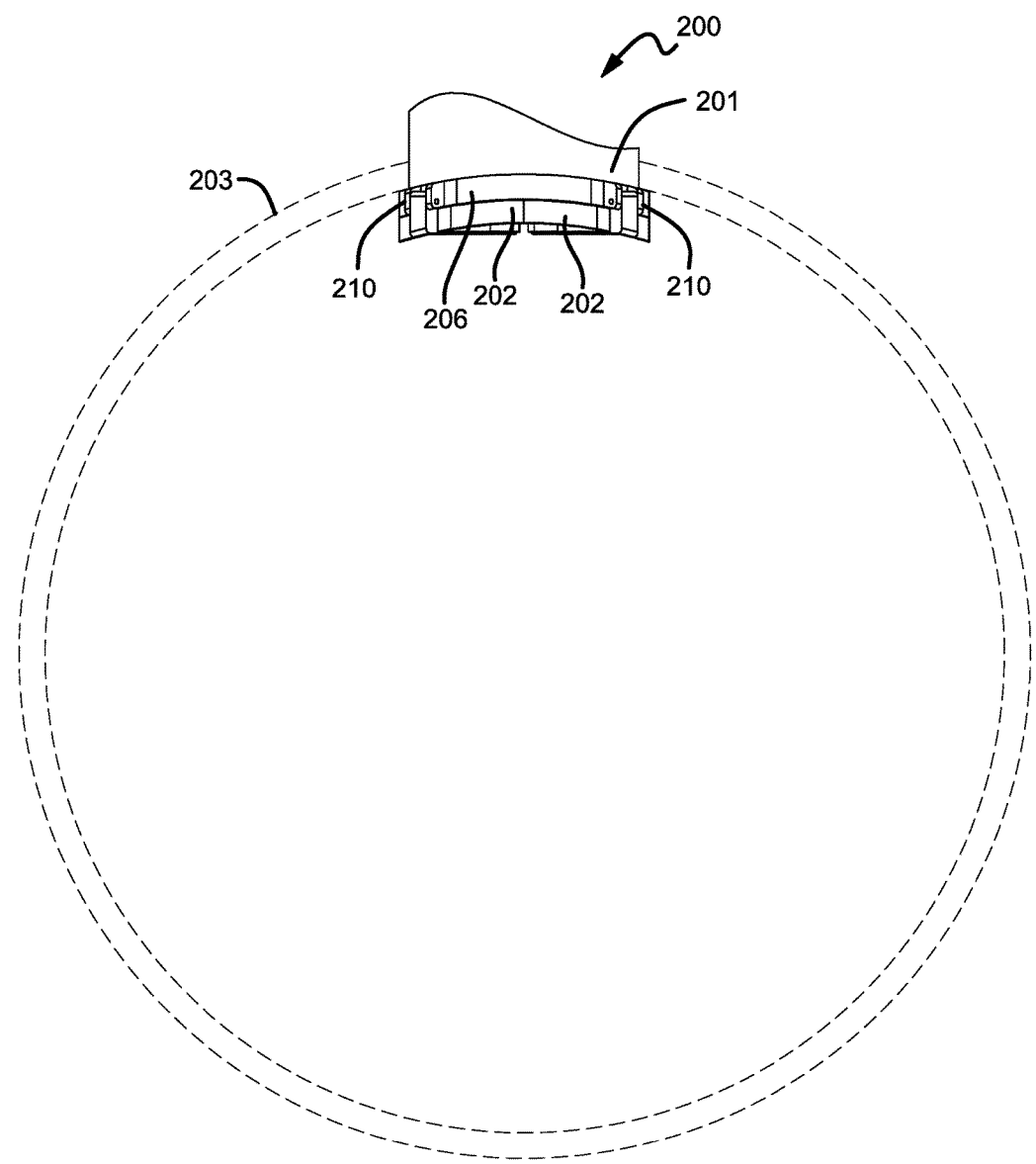

As with the single-door embodiment described above, while at rest, the two doors 202 of the double-door flap gate 200 meet to create a continuous concave outer surface, as seen in FIGS. 9A and 9B, where the outer surface of the doors 202 is the surface of the doors that does not contact the structural element 206 when the doors are at rest. It is also contemplated that the doors 202 can meet to form a flat surface, or even a convex surface.

It is contemplated that a door (or both doors) of double-door embodiments can include one or more features, for example, holes 212, at the bottom portion to facilitate fluid flow even when insufficient fluid has built up behind the door 202 to cause the door 202 to push open. The feature can be, for example, one or more apertures, a mesh, or a cutoff bottom portion of the door.

To accommodate a double-door configuration, two hinges 210 are necessary (e.g., one for each door 202). The hinges 210 are coupled on both the left side and the right side of the structural element 206, as seen in FIG. 8. The hinges 210 are fixed to the structural element 206 so that the hinges 210 are set at an angle relative to horizontal. It is contemplated that the hinges can be mounted at an angle of 1-89 degrees relative to horizontal (where the angle is measured as an absolute value), but more preferably 10-80 degrees.

Horizontal is shown by dotted line 214 as shown in FIG. 8, and angles are measured between the horizontal line 214 and the axes of rotation 216 for the hinges 210. Angle measurements are intended be absolute value measurements (e.g., measured as a rotation in either direction from horizontal). For example, as shown in FIG. 8, the left hinge is angled by rotation in a direction that is opposite to the direction that the right hinge is rotated.

In double-door embodiments of the flap gate, each door 202 can include a linkage 218 to couple the doors with the hinges 210. A left linkage and a right linkage are seen in FIGS. 7-8, 10, and 12. As described above, linkages can be used to couple the left door to the left hinge and the right door to the right hinge. The linkages 218 can couple with the doors 202 using rotating couplings 220 (e.g., a hinge or pin joint) or the linkages 218 can couple with the doors 202 by a fixed means (e.g., a weld or fasteners such as screws/nuts/bolts).

Linkages of the inventive subject matter can include multiple components (e.g., several rods/arms), or linkages can include a single rod or arm that couples the door to the structural element via one or more hinges (e.g., the right and left hinges and optionally hinges that couple the doors to the linkages).

In one example of a double-door flap gate of the inventive subject matter, the flap gate is attached to a drainage system for a retaining wall. A double-door flap gate can be useful on such a drainage system to prevent animals from crawling into the pipe, and also to improve the aesthetics of the drainage system so that it better matches the wall where it's mounted. When water flows through the drainage system, it flows out of the pipe that the flap gate is attached to. The doors of the flap gate are caused to open when sufficient water builds up behind the doors that the pressure head of the water pushes the doors open to allow draining.

Thus, specific embodiments of flap gates have been disclosed. It should be apparent to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A flap gate comprising:
a first door coupled with a first hinge and a second door coupled with a second hinge, wherein the first door and the second door together form a continuous concave surface; and
a structural element having a through-hole, wherein the first hinge and the second hinge couple with the structural element,
wherein the first door and the second door rest against a first side of the structural element to cover the through-hole, and wherein a second side of the structural element opposite has a concave shape having a radius of curvature that is substantially similar to a radius of curvature of an interior wall of a cylindrical structure, the second side of the structural element configured for mating with the interior wall of the cylindrical structure.

2. The flap gate of claim 1, wherein at least one of the first door and the second door comprises a feature to allow fluid flow while the first door and the second door rest against the structural element.

3. The flap gate of claim 1, wherein the structural element comprises a feature on a bottom portion of the structural element to allow fluid flow while the first door and the second door rest against the structural element.

4. The flap gate of claim 1, wherein the first hinge couples with the first door via at least one linkage such that the at least one linkage allows for rotation about a fixed axis at: (1) a first coupling point where the linkage couples with the first door and (2) at a second coupling point where the linkage couples with the first hinge.

5. The flap gate of claim 1, wherein the second hinge couples with the second door via at least one linkage such that the at least one linkage allows for rotation about a fixed axis at: (1) a first coupling point where the linkage couples with the second door and (2) at a second coupling point where the linkage couples with the second hinge.

6. The flap gate of claim 1, wherein the first hinge is coupled with the structural element such that the first door opens by rotating about a first axis of rotation of the first hinge, and wherein the first axis of rotation is angled between 10 and 80 degrees from horizontal.

7. The flap gate of claim 1, wherein the second hinge is coupled with the structural element such that the second door opens by rotating about a first axis of rotation of the first hinge, and wherein the first axis of rotation is angled between 10 and 80 degrees from horizontal.

8. A flap gate comprising:
a door coupled with a hinge, wherein the door comprises a concave outer surface; and
the hinge coupled with a structural element having a through-hole, wherein the hinge is coupled with the structural element such that the door opens by rotating about an axis of rotation of the hinge, and wherein the axis of rotation is angled between 10 and 80 degrees from horizontal, wherein the door rests against a first side of the structural element to cover the through-hole, and wherein a second side of the structural element opposite has a concave shape having a radius of curvature that is substantially similar to a radius of curvature of an interior wall of a cylindrical structure, the second side of the structural element configured for mating with the interior wall of the cylindrical structure.

9. The flap gate of claim 8, wherein the door comprises a feature on a bottom portion of the door to allow fluid flow past the door while the door rests against the structural element.

10. The flap gate of claim 8, wherein the structural element comprises a feature on a bottom portion of the structural element to allow fluid flow while the door rests against the structural element.

11. The flap gate of claim 8, wherein the hinge is coupled with the structural element such that the door opens by rotating about an axis of rotation defined by the orientation of the hinge, and wherein the axis of rotation is angled between 10 and 80 degrees from horizontal.

12. A flap gate comprising:
a first door coupled with a first hinge and a second door coupled with a second hinge, wherein the first door and the second door together form a continuous concave surface; and
a structural element having a through-hole, wherein the first hinge and the second hinge couple with the structural element,
wherein the first door and the second door rest against a first side of the structural element to cover the through-hole,
wherein a second side of the structural element opposite has a concave shape having a radius of curvature that is substantially similar to a radius of curvature of an interior wall of a cylindrical structure, the second side of the structural element configured for mating with the interior wall of the cylindrical structure, and
wherein at least one of the first door, the second door or the structural element comprises a feature to allow fluid flow while the first door and the second door rest against the structural element.

13. The flap gate of claim 12, wherein the first hinge couples with the first door via at least one linkage such that the at least one linkage allows for rotation about a fixed axis at: (1) a first coupling point where the linkage couples with the first door and (2) at a second coupling point where the linkage couples with the first hinge.

14. The flap gate of claim 12, wherein the second hinge couples with the second door via at least one linkage such that the at least one linkage allows for rotation about a fixed axis at: (1) a first coupling point where the linkage couples with the second door and (2) at a second coupling point where the linkage couples with the second hinge.

15. The flap gate of claim 12, wherein the first hinge is coupled with the structural element such that the first door opens by rotating about a first axis of rotation of the first hinge, and wherein the first axis of rotation is angled between 10 and 80 degrees from horizontal.

16. The flap gate of claim 15, wherein the second hinge is coupled with the structural element such that the second door opens by rotating about a first axis of rotation of the first hinge, and wherein the first axis of rotation is angled between 10 and 80 degrees from horizontal.

17. The flap gate of claim 12, wherein the structural element comprises a feature on a bottom portion of the structural element to allow fluid flow while the first door and the second door rest against the structural element.

\* \* \* \* \*